(12) United States Patent
Bernards

(10) Patent No.: US 7,767,009 B2
(45) Date of Patent: Aug. 3, 2010

(54) SOLUTION AND PROCESS FOR IMPROVING THE SOLDERABILITY OF A METAL SURFACE

(75) Inventor: Roger F. Bernards, South Haven, MN (US)

(73) Assignee: OMG Electronic Chemicals, Inc., South Plainfield, NJ (US)

( * ) Notice: Subject to any disclaimer, the term of this patent is extended or adjusted under 35 U.S.C. 154(b) by 532 days.

(21) Appl. No.: 11/226,613

(22) Filed: Sep. 14, 2005

(65) Prior Publication Data

US 2007/0056464 A1 Mar. 15, 2007

(51) Int. Cl.
*C23C 18/40* (2006.01)

(52) U.S. Cl. .................. 106/1.26; 106/1.25; 106/1.05; 106/1.13; 106/1.14; 427/436

(58) Field of Classification Search ................. 427/436; 106/1.05, 1.25, 1.26, 1.19, 14.05
See application file for complete search history.

(56) References Cited

U.S. PATENT DOCUMENTS

| | | | |
|---|---|---|---|
| 3,294,578 A * | 12/1966 | Popeck | 427/437 |
| 3,776,740 A | 12/1973 | Sivertz et al. | |
| 4,066,804 A | 1/1978 | Andrews | |
| 4,873,139 A | 10/1989 | Kinosky | |
| 5,203,911 A | 4/1993 | Sricharoenchaikit et al. | |
| 5,322,553 A | 6/1994 | Mandich et al. | |
| 5,532,025 A | 7/1996 | Kinlen et al. | |
| 5,733,599 A | 3/1998 | Ferrier et al. | |
| 5,935,640 A | 8/1999 | Ferrier et al. | |
| 5,955,141 A | 9/1999 | Soutar et al. | |
| 6,200,451 B1 | 3/2001 | Redline et al. | |
| 6,238,592 B1 | 5/2001 | Hardy et al. | |
| 6,319,543 B1 | 11/2001 | Soutar et al. | |
| 6,395,329 B2 | 5/2002 | Soutar et al. | |
| 6,607,653 B1 * | 8/2003 | Tsuji et al. | 205/241 |
| 6,646,082 B2 | 11/2003 | Ghosh et al. | |
| 6,860,925 B2 | 3/2005 | Soutar et al. | |
| 6,869,637 B2 | 3/2005 | Hutchinson et al. | |
| 2003/0157264 A1 * | 8/2003 | Hutchinson et al. | 427/443.1 |
| 2005/0126429 A1 * | 6/2005 | Bernards et al. | 106/14.05 |
| 2005/0175780 A1 | 8/2005 | Sparing et al. | |

FOREIGN PATENT DOCUMENTS

| | | |
|---|---|---|
| EP | 481667 | 4/1992 |
| EP | 692554 | 1/1996 |
| JP | 01068478 | 3/1989 |
| JP | 03024276 | 2/1991 |
| JP | 04097912 | 3/1992 |
| JP | 06272065 | 9/1994 |
| JP | 07145491 | 6/1995 |
| WO | WO 9617975 A1 * | 6/1996 |

OTHER PUBLICATIONS

E.V. Rakovich, L.S. Tsybulskaya, T.V. Caevskaya, L.S. Ivanaskevich; Structure of electroless-plated nickel-boron films, Vestsi Akademii Navuk USSR, Seryya Khimichnykh Navuk (1991), (6), 65-9, NII Fiz.-Khim. Probl., USSR (abstract).

Jing Li Fang, Nai Jun Wu; Study of antitarnish films on copper, Plating and Surface Finishing (1990), 77(2), 54-8, Appl. Chem. Ins., Nanjing Univ., Nanjing, Peop. Rep. China (abstract).

R. Veleva; Electroless deposition of highly conductive copper coatings, Izvestiya po Khimiya (1986), 19(3), 325-9, Cent. Lab. Photogr. Process., Sofia, 1040, Bulgaria (abstract).

* cited by examiner

*Primary Examiner*—Michael Barr
*Assistant Examiner*—Robert S Walters, Jr.
(74) *Attorney, Agent, or Firm*—McAndrews, Held & Malloy, Ltd.

(57) ABSTRACT

The invention is directed to a solution and process for improving the solderability of a metal surface. In one embodiment, the invention is a silver deposit solution comprising an acid, a source of silver ions, and an additive selected from among pyrroles, triazoles, and tetrazoles, as well as derivatives and mixtures of those components. In another embodiment, the silver deposit solution also includes a 6-membered heterocyclic ring compound, wherein three members of the 6-membered heterocyclic ring are nitrogen atoms. Still another embodiment is a process for improving the solderability of a metal surface which involves applying a silver deposit solution as previously described to a metal surface.

23 Claims, No Drawings

SOLUTION AND PROCESS FOR IMPROVING THE SOLDERABILITY OF A METAL SURFACE

CROSS-REFERENCE TO RELATED APPLICATIONS

Not applicable.

FIELD OF THE INVENTION

The present invention relates generally to solutions used to deposit or plate silver onto a metal surface. More particularly, the present invention relates to the use of a silver deposit solution to improve the solderability of a printed circuit board.

BACKGROUND OF THE INVENTION

Soldering is a process that is used to bond similar or dissimilar materials by melting a filler metal or alloy that is placed between the components being joined. Soldering has many applications, including plumbing, jewelry making and repair, and the making of electrical connections.

In the manufacture of printed circuit boards, soldering is used to make electrical connections to and between printed circuits. Specifically, soldering is carried out by coating the through hole walls and other conductive surfaces of a printed wiring board with hot, molten solder to make electrical connections by wetting and filling the spaces between the conductive through hole surfaces and the leads of electrical components which have been inserted through the through holes. If the solder adheres inconsistently to the conductive surfaces, or forms too weak a bond with the conductive surfaces, the circuit board may fail or malfunction.

Soldering inconsistencies are often the result of difficulties in keeping the conductive surfaces of the printed circuit board clean and free of tarnishing (oxidation) during the soldering process. A number of treatments have been developed to preserve conductive surfaces (in particular, copper surfaces) in order to improve solderability. For example, Hot Air Solder Leveling (HASL) techniques apply a thin layer of solder to preserve the conductive surfaces and improve solderability in subsequent soldering steps. Other techniques which have been used to prevent surface oxidation and improve solderability include Electroless Nickel/Immersion Gold (ENIG), Organic Solder Preservative (OSP), immersion tin and immersion silver techniques. One immersion silver technique is described in U.S. Pat. No. 6,200,451 (Redline et al.), which proposes the use of a silver plating solution with certain additives to enhance the solderability of a surface. Another immersion silver technique is described in U.S. Pat. No. 6,395,329 (Soutar et al.), which proposes the incorporation of tarnish inhibitors into an immersion plating bath.

While many of the above techniques have been used commercially to manufacture printed circuit boards, there exists a need for improved techniques for treating metal surfaces to enhance solderability, such as techniques which reduce the cost of the treatment or improve the effectiveness of treatment, while maintaining or improving the aesthetic appeal of the resulting surface. For example, the immersion silver technique described in U.S. Pat. No. 6,200,451 (Redline et al.) suffers from the disadvantage that the additives used in the solution are unstable, i.e. the additives deteriorate if the solution sits idle. As a result, the immersion silver solution must be frequently analyzed to determine whether the additives are present in the appropriate concentrations and, if not, the solution must be replenished with additional additives. The additional analysis steps and need to replenish the additives increases the cost and overall complexity of using this immersion silver technique. This is complicated by the fact that the additives used in the solution are particularly difficult to detect through standard analysis techniques. As is described below, the inventors have developed an improved solution and process for treating a surface in order to improve the solderability of the surface which avoids the aforementioned disadvantages and provides other improvements over the prior art techniques.

BRIEF SUMMARY OF THE INVENTION

Accordingly, an object of this invention is to provide improved techniques for treating metal surfaces to enhance solderability.

Another object is to provide techniques for treating metal surfaces to enhance solderability which reduce the cost of treatment as compared to at least some other solderability enhancement processes.

A further object is to provide techniques for treating metal surfaces to enhance solderability which improve the effectiveness of treatment as compared to at least some other solderability enhancement processes.

Yet another object is to provide a silver deposit solution which enhances the solderability of a metal surface while maintaining or improving the aesthetic appeal of the resulting surface.

A further object is to provide a silver deposit solution which improves the solderability of a metal surface as compared to at least some other silver deposit processes.

A yet further object is to provide a silver deposit solution which enhances the solderability of a metal surface at a lesser cost than at least some other silver deposit processes.

Another object is to provide a silver deposit solution which enhances the solderability of a metal surface and yet does not require frequent replenishment of components in the solution that have deteriorated.

Another object is to provide a silver deposit solution which enhances the solderability of a metal surface and yet does not require a complexing agent.

Yet another object is to provide a silver deposit solution which enhances the solderability of a metal surface and yet does not require a surfactant.

Other objects of the invention will become apparent to one skilled in the art who has the benefit of the specification and the prior art.

At least one of these objects is addressed, in whole or in part, by the present invention. In one aspect, the invention is a silver deposit solution and process for improving the solderability of a metal surface. The silver deposit solution includes an acid, a source of silver ions, and an additive selected from among pyrroles, triazoles, and tetrazoles, as well as derivatives and mixtures of those components.

Another aspect of the invention is a silver deposit solution as previously described, where the pH of the solution is less than 3 or, alternatively, less than 2.

Another aspect of the invention is a silver deposit solution as previously described, where the solution is essentially free of a complexing agent.

Still another aspect of the invention is a silver deposit solution as previously described which further includes a 6-membered heterocyclic ring compound, wherein three members of the 6-membered heterocyclic ring are nitrogen atoms. In at least one aspect of the invention, this 6-membered heterocyclic ring compound is 1,2,3-benzotriazin-4(3H)-one.

Yet another aspect of the invention is a process for improving the solderability of a metal surface. The process involves applying a silver deposit solution as previously described to a metal surface. In at least one aspect of the invention, the metal surface is a copper surface.

DETAILED DESCRIPTION OF THE INVENTION

While the invention will be described in connection with several embodiments, it will be understood that the invention is not limited to those embodiments. On the contrary, the invention includes all alternatives, modifications, and equivalents as may be included within the spirit and scope of the appended claims.

As noted above, one aspect of the present invention is a silver deposit solution comprising an acid, a source of silver ions, and an additive selected from among pyrroles, triazoles, tetrazoles, derivatives and mixtures thereof.

Any suitable organic or inorganic acid known to those in the art may be used in the present solution. Non-limiting examples of suitable acids include nitric, sulfuric, phosphoric, acetic, formic, sulfamic, hydroxy-acetic acid, methane sulfonic acid, and mixtures thereof. Alternatively, nitric acid may be selected. The acid may be present in the solution in the range between about 0.005% and about 10% by weight, alternatively in the range between about 0.5% and about 4% by weight, alternatively in the range between about 1% and about 3% by weight. Alternatively, the acid may be present in the solution at about 2% by weight. The weight percentages given above assume the use of an undiluted acid as opposed to an acid solution. If an acid solution is used (e.g. a 60% solution of nitric acid), the weight percentages given above should be adjusted accordingly. Although not necessary, the pH of the present solution may be less than 7. Alternatively, the pH of the solution may be less than 3. As yet another alternative, the pH of the solution may be less than 2.

Any suitable source of silver ions known to those in the art may be used in the present solution. A silver salt may be selected as the source of silver ions. Non-limiting examples of suitable sources of silver ions include silver nitrate, silver chloride, silver oxide, silver iodide, silver sulfide, silver cyanide, silver hyposulphite, silver sulphate, and silver nitrite. Alternatively, silver nitrate may be selected as the source of silver ions. The concentration of silver ions in the solution will vary depending on a number of factors such as the method used to apply the solution, the speed at which the user wishes to deposit the silver, etc. By way of non-limiting example, the source of silver ions may be present in the solution in the range between about 0.01 and about 10 grams silver ions per liter, alternatively in the range between about 0.1 and about 5 grams silver ions per liter, alternatively in the range between about 0.75 and about 2 grams silver ions per liter.

As stated above, this aspect of the present invention contains an azole additive selected from among pyrroles, triazoles, tetrazoles, derivatives of the foregoing, and mixtures of the foregoing. Alternatively, the azole additive consists of 5-membered aromatic or fused aromatic heterocyclic rings in which 1, 3 or 4 members of the ring are nitrogen atoms. Any suitable pyrrole or pyrrole derivative known to those in the art may be used in the present solution. Non-limiting examples of pyrroles and pyrrole derivatives include pyrrole, 1-methylpyrrole, 2-ethylpyrrole, 1-methyl-2-pyrroleacetonitrile, indole, and 4-nitroindole. Any suitable triazole or triazole derivative known to those in the art may be used in the present solution. Non-limiting examples of suitable triazoles and triazole derivatives include benzotriazole, tolytriazole (also known as 5-methyl-1H-benzotriazole), 1H-1,2,3-triazole, 3-nitro-1,2,4-triazole, and 1-hydroxybenzotriazole. Alternatively, benzotriazole or tolytriazole may be selected for use herein. Any suitable tetrazole or tetrazole derivative known to those in the art may be used in the present invention. Non-limiting examples of suitable tetrazoles and tetrazole derivatives include 1H-tetrazole, 5-amimotetrazole monohydrate, and 5-phenyl-1H-tetrazole. By way of non-limiting example, the azole additive may be present in the solution in the range between about 0.05 and about 4 grams per liter, alternatively in the range between about 0.1 and about 3 grams per liter, alternatively in the range between about 0.3 and about 1.5 grams per liter.

The silver deposit solution of the present invention deposits silver on a metal surface through what is known as an immersion reaction. An immersion silver reaction is a phase change reaction in which the silver ions in solution are exchanged for, or take the place of, metal ions from the metal surface (e.g. copper ions in the case of a copper surface). Some immersion silver techniques have employed complexing agents (or chelators), presumably to better solubilize the silver ions so that the exchange reaction may proceed more easily. The present inventors have found, surprisingly, that the present silver deposit solution can be used successfully in the absence of a complexing agent. In addition to simply reducing the cost of the silver deposit solution, the absence of a complexing agent allows for easier recycling of the solution after use. For example, when the silver deposit solution is applied to a copper surface, the silver ions in the solution are replaced with copper ions from the copper surface. If a complexing agent is used, the copper ions form a complex with the agent and are thus difficult to recover from the solution. Accordingly, another aspect of the present invention is a silver deposit solution which is essentially free of a complexing agent, or, alternatively, a silver deposit solution to which no complexing agent is added. The phrase "essentially free of a complexing agent" means that any complexing agent, if in the solution at all, is present in such low concentrations that its impact on the silver deposit function of the solution is insignificant. As yet another alternative, the silver deposit solution may contain no more than trace amounts of a complexing agent or, alternatively, less than 0.1 wt % of a complexing agent.

Another aspect of the present invention is. a silver deposit solution as described above which contains, as an additional component, a 6-membered heterocyclic ring compound, wherein three members of the 6-membered heterocyclic ring are nitrogen atoms. It has been found that the addition of such a compound to the silver deposit solution improves both the uniformity and aesthetics of the resulting silver-plated surface. For example, surfaces treated with a silver deposit solution containing such a compound are shinier and less likely to exhibit "swirling" features.

Any 6-membered heterocyclic ring compound, in which three members of the 6-membered heterocyclic ring are nitrogen atoms, may be used in the present solution. The 6-membered heterocyclic ring may or may not be fused to another ring structure. Suitable examples include (but are not limited to) triazines, triazinones, and derivatives thereof. Several non-limiting specific examples include 1,2,3-benzotriazin-4 (3H)-one (also known as 4-ketobenzotriazine or benzazimide); 5,6-di-2-furyl-3-(2-pyridyl)-1,2,4-triazine; and 3-hydroxy-1,2,3-benzotriazin 4(3H)-one. Alternatively, 1,2,3-benzotriazin-4(3H)-one may be selected for use herein. By way of non-limiting example, the 6-membered heterocyclic ring compound may be present in the solution in the range between about 0.01 and about 4 grams per liter, alternatively in the range between about 0.05 and about 3 grams per liter, alternatively in the range between about 0.1 and about 1 grams per liter. As yet another alternative, the 6-membered heterocyclic ring compound may be present in the solution in the ratio of about 1 g/L per 10 g/L of the azole additive in the solution, alternatively in the ratio of about 1 g/L per 5 g/L of the azole additive in the solution, alternatively in the ratio of about 1 g/L per 1 g/L of the azole additive in the solution.

The present immersion silver deposit solution may contain any number of optional components. Non-limiting examples of suitable optional components include surfactants, oxidizers, wetting agents, silver stabilizers, dyes, and chelators.

Any suitable surfactant known to those in the art may be used in the present solution. Non-limiting examples of suitable surfactants include ionic surfactants such as those described in U.S. Pat. No. 6,200,451 (Redline et al.) (fatty amines, fatty amides, quaternary salts, amphoteric salts resinous amines, resinous amides, fatty acids, resinous acids, etc.), nonionic surfactants such as alcohol ethoxylates (nonylphenol ethoxylate being one example), and mixtures thereof. When present, the surfactant may be present in the solution in the range between about 1 part per million (ppm) and about 100 grams per liter, alternatively in the range between about 0.1 gram per liter and about 50 grams per liter, alternatively in the range between about 1 grams per liter and about 10 grams per liter. One reason for employing a surfactant in the silver deposit solution is to prevent precipitation or reduce the amount of precipitation in the solution (a small amount of precipitation is acceptable, but too much precipitation reduces or destroys the effectiveness of the solution for depositing silver on a metal surface). Another reason for employing a surfactant is to reduce the solubility issues that arise with the use of a complexing agent. The applicants have discovered, surprisingly, that the present silver deposit solution may be used successfully in the absence of a surfactant. So, while a surfactant may optionally be employed, another aspect of this invention is a silver deposit solution which is essentially free of a surfactant or, alternatively, a silver deposit solution to which no surfactant is added. The phrase "essentially free of a surfactant" means that any surfactant, if in the solution at all, is present in such low concentrations that its impact on the silver deposit function of the solution is insignificant. As yet another alternative, the silver deposit solution may contain no more than trace amounts of a surfactant or, alternatively, less than 0.1 wt % of a surfactant.

Any suitable oxidizer or silver stabilizer known to those in the art may be used in the present solution. Non-limiting examples of suitable oxidizers and silver stabilizers include hydrogen peroxide, nitric acid (which may also serve as the acid in the present solution), and organic nitro- compounds such as nitrobenzene sulfonate and 4-hydroxy-3,5-dinitrobenzoic acid. When present, the oxidizer or silver stabilizer may be present in the solution in the range between about 1 part per million (ppm) and about 100 grams per liter, alternatively in the range between about 1 gram per liter and about 50 grams per liter, alternatively in the range between about 5 grams per liter and about 30 grams per liter.

Any suitable wetting agent known to those in the art may be used in the present solution. Non-limiting examples of suitable wetting agents include polyethylene glycol ("PEG") and PEG/polypropylene glycol block co-polymers. When present, the wetting agent may be present in the solution in the range between about 1 part per million (ppm) and about 100 grams per liter, alternatively in the range between about 1 gram per liter and about 50 grams per liter, alternatively in the range between about 5 grams per liter and about 30 grams per liter.

Any suitable dye known to those in the art may be used in the present solution. Among other reasons, a dye may optionally be added to the solution in order to enhance the appearance of the deposited silver. Non-limiting examples of suitable dyes include methyl violet, methylene blue, and brilliant green. When present, the dye may be present in the solution in the range between about 1 part per million (ppm) and about 100 grams per liter, alternatively in the range between about 1 gram per liter and about 50 grams per liter, alternatively in the range between about 5 grams per liter and about 30 grams per liter.

As explained above, a chelator, or complexing agent, is not a necessary component for any of the silver deposit solutions described herein, and indeed, one aspect of the present invention is a silver deposit solution which is essentially free of a complexing agent (or, alternatively, a silver deposit solution to which no complexing agent is added). Nonetheless, a chelator or complexing agent may be employed if desired. Any suitable chelator known to those in the art may be used in the present solution. Non-limiting examples of suitable chelators include hydroxylethyl ethylenediamine triacetic acid (HEDTA), sodium potassium tartarate, nitrilotriacetic acid, citric acid, ethylene diamine, and ethylene diamine tetraacetic acid (EDTA). Other examples of suitable complexing agents are listed in U.S. Pat. No. 6,395,329 (Soutar et al.). When present, the chelator or complexing agent may be present in the solution in the range between about 1 part per million (ppm) and about 100 grams per liter, alternatively in the range between about 1 gram per liter and about 50 grams per liter, alternatively in the range between about 5 grams per liter and about 30 grams per liter. Alternatively, the chelator or complexing agent may be present in an amount sufficient to provide coordination sites for all of the silver ions in the solution.

Another aspect of the present invention is a process of improving the solderability of a metal surface, comprising the steps of (1) providing a metal surface and (2) applying an immersion silver deposit solution as described above to the metal surface.

The metal surface may be comprised of any metal or alloy to which a solder may be applied. Non-limiting examples of suitable metal surfaces include copper, lead, nickel, cobalt, iron, tin, zinc, chromium, aluminum, and alloys thereof. Alternatively, the metal surface is comprised of copper or a copper alloy.

The metal surface can be treated with the immersion silver deposit solution in a variety of ways, including (but not limited to) immersion in a bath, dipping in a bath, or spraying. The treatment may take place at any temperature and for any duration suitable to obtain the desired improvement in the solderability of the metal surface. For example, surfaces with improved solderability may be obtained where the temperature during treatment is in the range from about 50° F. to about 180° F. (about 10° C. to about 82° C.), alternatively from about 70° F. to about 150° F. (about 21° C. to about 66° C.), alternatively from about 80° F. to about 130° F. (about 27° C. to about 54 ° C.), alternatively about 120° F. (about 50° C.). Surfaces with improved solderability may also be obtained with temperatures outside of these ranges, however. With respect to duration, the silver deposit solution may, for example, be contacted with the metal surface for about 1 second to about 1 hour, alternatively from about 10 seconds to about 10 minutes, alternatively from about 20 seconds to about 6 minutes, alternatively from about 1 minute to about 3 minutes. Surfaces with improved solderability may also be obtained with contact durations outside of these ranges, however. In fact, the contact duration is at least partly a function of the desired thoroughness of the silver plating, the concentration of silver ions in the solution, and the process used to apply the solution to the metal surface.

In keeping with another aspect of the present invention, the process of improving the solderability of metal surfaces may include the following steps, some of which are optional:

(i) Providing a substantially clean metal surface, optionally by applying a weakly alkaline to acidic cleaning solution to a metal surface. The cleaning solution may optionally include a surfactant, a phosphate, a phosphate ester, a solvent, or mixtures of the foregoing. For example, a suitable cleaning solution may contain the following components: phosphoric acid, ethylene glycol, Neodol 91-8 (a surfactant), and deionized water.

(ii) Optionally rinsing the cleaning solution from the metal surface with water.

(iii) Optionally applying a microetch solution (such as peroxide or persulfate) to remove oxidants and scum from the metal surface. For example, a suitable microetch solution may contain sodium persulfate and citric acid. The metal surface may be optionally rinsed (with deionized water, for example) after a microetch solution is applied.

(iv) Optionally dipping the substantially clean metal surface into a pre-dip to condition the surface and/or to remove any remaining cleaning solution or microetch solution from the metal surface. The pre-dip may, for example, be deionized water.

(v) Applying to the substantially clean metal surface a silver deposit solution as is described herein in a variety of aspects.

Step (i) may further include draining excess cleaning solution from the copper surface.

It should be noted that halide ions (such as chloride ions) tend to react with silver ions in solution to form a precipitate. For this reason, it is helpful (although not necessary) to limit the amount of halide ions present in the silver deposit solution itself, as well as in the process steps surrounding the application of the deposit solution. For example, if nitric acid is selected as the acid for use in the silver deposit solution, the nitric acid may be purged of all halide ions or, alternatively, of all chloride ions. Alternatively, the halide ion (or chloride ion) concentration in the nitric acid may be limited to less than 0.5 ppm. Likewise, any deionized water used in the silver deposit solution or process steps surrounding its application (such as cleaning steps, rinsing steps, or pre-dip steps) may optionally be purged of all halide ions (or chloride ions) or limited to a halide ion (or chloride ion) concentration of less than 0.5 ppm.

The inventors have found that, when applied to a metal surface, the described solutions form a silver deposit which protects the metal surface from tarnishing. This in turn improves the solderability of the surface or, as the case may be, the conductive surfaces of a printed circuit board. In addition to imparting anti-tarnishing properties to the silver deposit, the additives employed in the solution are both stable and easily analyzed (with such techniques as UV/visible spectroscopy, for example). This provides an advantage over some of the prior art techniques, which employ unstable additives that must be continuously replenished as they deteriorate over time, and which require costly analysis steps to ascertain the level of the additives in the solution. In addition, the silver plating which results from the use of the described solutions offers improvements in uniformity and aesthetics over at least some of the prior art techniques.

The following examples represent specific but nonlimiting embodiments of the present invention:

EXAMPLE 1

A silver deposit solution having the following composition was prepared:
1. 10% by weight of a 70% aqueous solution of MeHSO$_3$ (methane sulfonic acid).
2. 1.5 g/L silver (added as silver nitrate).
3. 1.0 g/L sodium tolytriazole.

The silver nitrate was added to the solution last, after the sodium tolytriazole had dissolved. The pH of the solution was less than 2.

Prior to use, the solution was maintained at a temperature of 50° C. and mildly agitated with a stir bar. A cleaned and etched copper surface was dipped into the silver deposit solution for approximately one minute. Silver was deposited onto the copper surface to a thickness of approximately 8.3 microns.

The resulting silver plated surface exhibited very good dewetting (a surface that does not wet is indicative of good incorporation of the azole into the silver deposit) and had a nice appearance, although the uniformity of the surface was average. Subsequent testing demonstrated that the surface exhibited good tarnish inhibition, and thus improved solderability.

EXAMPLE 2

A silver deposit solution having the following composition was prepared:
1. 3% by weight of a 60% solution of nitric acid.
2. 1.5 g/L silver (added as silver nitrate).
3. 1.0 g/L sodium tolytriazole.
4. 2 to 1 molar ratio of HEDTA (a chelator) (i.e. two moles of HEDTA per one mole of silver in the solution).

The pH of the solution was less than 2.

Prior to use, the solution was maintained at a temperature of 50° C. and mildly agitated with a stir bar. A cleaned and etched copper surface was dipped into the silver deposit solution for approximately one minute. Silver was deposited onto the copper surface.

The resulting silver plated surface exhibited excellent dewetting and had a nice appearance, although the uniformity of the surface was average. Subsequent testing demonstrated that the surface exhibited good tarnish inhibition, and thus improved solderability.

EXAMPLE 3

A silver deposit solution having the following composition was prepared:
1. 15% by weight of a 70% aqueous solution of MeHSO$_3$ (methane sulfonic acid).
2. 1.5 g/L silver (added as silver nitrate).
3. 1.0 g/L sodium tolytriazole.

The silver nitrate was added to the solution last, after the sodium tolytriazole had dissolved. The pH of the solution was less than 2.

Prior to use, the solution was maintained at a temperature of 50° C. and mildly agitated with a stir bar. A cleaned and etched copper surface was dipped into the silver deposit solution for approximately one minute. Silver was deposited onto the copper surface.

The resulting silver plated surface exhibited good dewetting and had a very nice appearance, although the uniformity of the surface was average. Subsequent testing demonstrated that the surface exhibited good tarnish inhibition, and thus improved solderability.

EXAMPLE 4

A silver deposit solution having the following composition was prepared:
1. 3.0% by weight of a 60% solution of nitric acid.
2. 1.5 g/L silver (added as silver nitrate).
3. 0.6 g/L sodium tolytriazole.
4. 0.7 g/L 1,2,3-benzotriazin-4(3H)-one.

5. 2 g/L Igepal CA-897 (a high molecular weight nonylphenol ethoxylate that serves as a nonionic surfactant).
6. 0.03 molar citric acid (a chelator).

The pH of the solution was less than 2.

Prior to use, the solution was maintained at a temperature of 50° C. and mildly agitated with a stir bar. A cleaned and etched copper surface was dipped into the silver deposit solution for approximately one minute. Silver was deposited onto the copper surface.

The resulting silver plated surface exhibited good dewetting, appearance, and uniformity. In particular, the surface exhibited improved appearance and uniformity over the prior examples which did not employ a triazinone. Subsequent testing demonstrated that the surface exhibited good tarnish inhibition, and thus improved solderability.

EXAMPLE 5

A silver deposit solution having the following composition was prepared:
1. 3.0% by weight of a 60% solution of nitric acid.
2. 1.5 g/L silver (added as silver nitrate).
3. 0.7 g/L sodium tolytriazole.
4. 0.8 g/L 1,2,3-benzotriazin-4(3H)-one.
5. 4 g/L Igepal CA-897 (a nonionic surfactant).

The pH of the solution was less than 2.

Prior to use, the solution was maintained at a temperature of 50° C. and mildly agitated with a stir bar. A cleaned and etched copper surface was dipped into the silver deposit solution for approximately one minute. Silver was deposited onto the copper surface.

The resulting silver plated surface exhibited good dewetting, appearance, and uniformity. In particular, the surface exhibited improved appearance and uniformity over the prior examples which did not employ a triazinone. Subsequent testing demonstrated that the surface exhibited good tarnish inhibition, and thus improved solderability.

EXAMPLE 6

A silver deposit solution having the following composition was prepared:
1. 2.5% by weight of a 60% solution of nitric acid.
2. 1.5 g/L silver (added as silver nitrate).
3. 0.4 g/L sodium tolytriazole.
4. 0.8 g/L 1,2,3-benzotriazin-4(3H)-one.
5. 2 g/L Igepal CA-897 (a nonionic surfactant).

The pH of the solution was less than 2.

Prior to use, the solution was maintained at a temperature of 50° C. and mildly agitated with a stir bar. A cleaned and etched copper surface was dipped into the silver deposit solution for approximately one minute. Silver was deposited onto the copper surface.

The resulting silver plated surface exhibited good dewetting, appearance, and uniformity. In particular, the surface exhibited improved appearance and uniformity over the prior examples which did not employ a triazinone. Subsequent testing demonstrated that the surface exhibited good tarnish inhibition, and thus improved solderability.

EXAMPLE 7

A silver deposit solution having the following composition was prepared:
1. 3.0% by weight of a 60% solution of nitric acid.
2. 1.0 g/L silver (added as silver nitrate).
3. 0.6 g/L sodium tolytriazole.
4. 0.3 g/L 1,2,3-benzotriazin-4(3H)-one.

The pH of the solution was less than 2.

Prior to use, the solution was maintained at a temperature of 50° C. and mildly agitated with a stir bar. A cleaned and etched copper surface was dipped into the silver deposit solution for approximately two minutes. Silver was deposited onto the copper surface to a thickness of approximately 6.8 microns.

The resulting silver plated surface exhibited good dewetting, appearance, and uniformity. In particular, the surface exhibited improved appearance and uniformity over the prior examples which did not employ a triazinone. Subsequent testing demonstrated that the surface exhibited good tarnish inhibition, and thus improved solderability.

EXAMPLE 8

A silver deposit solution having the following composition is prepared:
1. 3.0% by weight of a 60% solution of nitric acid.
2. 1.0 g/L silver (added as silver nitrate).
3. 0.6 g/L 1-methylpyrrole.
4. 0.3 g/L 1,2,3-benzotriazin-4(3H)-one.

The pH of the solution is less than 2.

Prior to use, the solution is maintained at a temperature of 50° C. and mildly agitated with a stir bar. A cleaned and etched copper surface is then dipped into the silver deposit solution for approximately two minutes. Silver is deposited onto the copper surface.

The resulting silver plated surface exhibits good dewetting, appearance, and uniformity. Subsequent testing demonstrates that the surface exhibits good tarnish inhibition, and thus improved solderability.

EXAMPLE 9

A silver deposit solution having the following composition is prepared:
1. 3.0% by weight of a 60% solution of nitric acid.
2. 1.0 g/L silver (added as silver nitrate).
3. 0.6 g/L 5-aminotetrazole monohydrate.
4. 0.3 g/L 1,2,3-benzotriazin-4(3H)-one.

The pH of the solution is less than 2.

Prior to use, the solution is maintained at a temperature of 50° C. and mildly agitated with a stir bar. A cleaned and etched copper surface is then dipped into the silver deposit solution for approximately two minutes. Silver is deposited onto the copper surface.

The resulting silver plated surface exhibits good dewetting, appearance, and uniformity. Subsequent testing demonstrates that the surface exhibits good tarnish inhibition, and thus improved solderability.

EXAMPLE 10

A silver deposit solution having the following composition is prepared:
1. 3.0% by weight of a 60% solution of nitric acid.
2. 1.0 g/L silver (added as silver nitrate).
3. 0.6 g/L sodium tolytriazole.
4. 0.3 g/L 5,6-di-2-furyl-3-(2-pyridyl)-1,2,4-triazine.

The pH of the solution is less than 2.

Prior to use, the solution is maintained at a temperature of 50° C. and mildly agitated with a stir bar. A cleaned and etched copper surface is then dipped into the silver deposit solution for approximately two minutes. Silver is deposited onto the copper surface.

The resulting silver plated surface exhibits good dewetting, appearance, and uniformity. Subsequent testing demonstrates that the surface exhibits good tarnish inhibition, and thus improved solderability.

EXAMPLE 11

A silver deposit solution having the following composition is prepared:
1. Sufficient nitric acid to bring the solution to a pH of approximately 2.5.
2. 1.0 g/L silver (added as silver nitrate).
3. 0.6 g/L sodium tolytriazole.
4. 0.3 g/L 1,2,3-benzotriazin-4(3H)-one.

Prior to use, the solution is maintained at a temperature of 70° C. and mildly agitated with a stir bar. A cleaned and etched copper surface is dipped into the silver deposit solution for approximately two minutes. Silver is deposited onto the copper surface.

The resulting silver plated surface exhibits good dewetting, appearance, and uniformity. Subsequent testing demonstrates that the surface exhibits good tarnish inhibition, and thus improved solderability.

COMPARATIVE EXAMPLE 1

A silver deposit solution having the following composition is prepared:
1. 3.0% by weight of a 60% solution of nitric acid.
2. 1.0 g/L silver (added as silver nitrate).

Prior to use, the solution is maintained at a temperature of 50° C. and mildly agitated with a stir bar. A cleaned and etched copper surface is dipped into the silver deposit solution for approximately two minutes. Silver is deposited onto the copper surface.

The resulting silver plated surface exhibits poor appearance and uniformity (the surface is powdery). Subsequent testing demonstrates that the surface exhibits poor tarnish inhibition.

While the invention is described above in connection with illustrative embodiments and examples, they are not intended to be exhaustive or limiting of the invention. Rather, the invention is intended to cover all alternatives, modifications and equivalents included within its spirit and scope of the invention, as defined by the appended claims.

TABLE 1

|  | Example 1 | Example 2 | Example 3 | Example 4 | Example 5 | Example 6 |
| --- | --- | --- | --- | --- | --- | --- |
| Acid | 10 wt % MeHSO$_3$ | 3 wt % nitric acid | 15 wt % MeHSO$_3$ | 3.0 wt % nitric acid | 3.0 wt % nitric acid | 2.5 wt % nitric acid |
| Silver | 1.5 g/L | 1.5 g/L | 1.5 g/L | 1.5 g/L | 1.5 g/L | 1.5 g/L |
| Azole Additive | 1.0 g/L Sodium Tolytriazole | 1.0 g/L Sodium Tolytriazole | 1.0 g/L Sodium Tolytriazole | 0.6 g/L Sodium Tolytriazole | 0.7 g/L Sodium Tolytriazole | 0.4 g/L Sodium Tolytriazole |
| Triazine or Triazinone Additive | None | None | None | 0.7 g/L 1,2,3-benzotriazin-4(3H)-one | 0.8 g/L 1,2,3-benzotriazin-4(3H)-one | 0.8 g/L 1,2,3-benzotriazin-4(3H)-one |
| Chelator | None | 2:1 molar ratio of HEDTA to silver | None | 0.03 molar citric acid | None | None |
| Surfactant | None | None | None | 2 g/L Igepal CA-897 | 4 g/L Igepal CA-897 | 2 g/L Igepal CA-897 |
| pH of solution | Less than 2 | Less than 2 | Less than 2 | Less than 2 | Less than 2 | Less than 2 |
| Result | Improved solderability, average uniformity | Improved solderability, average uniformity | Improved solderability, average uniformity | Improved solderability, appearance, and uniformity | Improved solderability, appearance, and uniformity | Improved solderability, appearance, and uniformity |

TABLE 2

|  | Example 7 | Example 8 | Example 9 | Example 10 | Example 11 | Comparative Example 1 |
| --- | --- | --- | --- | --- | --- | --- |
| Acid | 3.0 wt % nitric acid | 3.0 wt % nitric acid | 3.0 wt % nitric acid | 3.0 wt % nitric acid | sufficient nitric acid to reach pH of about 2.5 | 3.0 wt % nitric acid |
| Silver | 1.0 g/L | 1.0 g/L | 1.0 g/L | 1.0 g/L | 1.0 g/L | 1.0 g/L |
| Azole Additive | 0.6 g/L Sodium Tolytriazole | 0.6 g/L 1-methyl-pyrrole | 0.6 g/L 5-amino-tetrazole | 0.6 g/L Sodium Tolytriazole | 0.6 g/L Sodium Tolytriazole | None |
| Triazine or Triazinone Additive | 0.3 g/L 1,2,3-benzotriazin-4(3H)-one | 0.3 g/L 1,2,3-benzotriazin-4(3H)-one | 0.3 g/L 1,2,3-benzotriazin-4(3H)-one | 0.3 g/L 5,6-di-2-furyl-3-(2-pyridyl)-1,2,4-triazine | 0.3 g/L 1,2,3-benzotriazin-4(3H)-one | None |
| Chelator | None | None | None | None | None | None |
| Surfactant | None | None | None | None | None | None |

TABLE 2-continued

| | Example 7 | Example 8 | Example 9 | Example 10 | Example 11 | Comparative Example 1 |
|---|---|---|---|---|---|---|
| pH of solution | Less than 2 | Less than 2 | Less than 2 | Less than 2 | about 2.5 | Less than 2 |
| Result | Improved solderability, appearance, and uniformity | Improved solderability, appearance, and uniformity | Improved solderability, appearance, and uniformity | Improved solderability, appearance, and uniformity | Improved solderability, appearance, and uniformity | Poor solderability, poor appearance and uniformity |

The invention claimed is:

1. A silver deposit solution comprising:
an acid;
a source of silver ions;
an additive selected from the group consisting of pyrroles, triazoles, tetrazoles, and mixtures of any of the foregoing; and, 1,2,3-benzotriazin-4(3H)-one.

2. The silver deposit solution of claim 1 wherein said acid is selected from the group consisting of nitric, sulfuric, phosphoric, acetic, formic, sulfamic, hydroxyl-acetic acid, methane sulfonic acid and mixtures thereof.

3. The silver deposit solution of claim 2, wherein said acid is nitric acid.

4. The silver deposit solution of claim 1 wherein said silver deposit solution has a pH less than 3.

5. The silver deposit solution of claim 1 wherein said silver deposit solution has a pH less than 2.

6. The silver deposit solution of claim 1 wherein said acid is present in said solution between about 0.005% and about 10% by weight.

7. The silver deposit solution of claim 1 wherein said acid is present in said solution between about 1% and about 3% by weight.

8. The silver deposit solution of claim 1, wherein said source of silver ions is selected from the group consisting of silver nitrate, silver chloride, silver oxide, silver iodide, silver sulfide, silver cyanide, silver hyposulphite, silver sulphate, silver nitrite and mixtures thereof.

9. The silver deposit solution of claim 8, wherein said source of silver ions is silver nitrate.

10. The silver deposit solution of claim 1 wherein said source of silver ions is present in said solution between about 0.01 and about 10 grams per liter.

11. The silver deposit solution of claim 1 wherein said source of silver ions is present in said solution between about 0.75 and about 2 grams per liter.

12. The silver deposit solution of claim 1, wherein said additive is selected from the group consisting of pyrroles.

13. The silver deposit solution of claim 12, wherein said additive is selected from the group consisting of pyrrole, 1-methylpyrrole, 2-ethylpyrrole, 1-methyl-2-pyrroleacetonitrile, indole, 4-nitroindole, and mixtures of any of the foregoing.

14. The silver deposit solution of claim 1, wherein said additive is selected from the group consisting of triazoles.

15. The silver deposit solution of claim 14, wherein said additive is selected from the group consisting of benzotriazoles, tolytriazoles, and mixtures of any of the foregoing.

16. The silver deposit solution of claim 1, wherein said additive is selected from the group consisting of tetrazoles.

17. The silver deposit solution of claim 16, wherein said additive is selected from the group consisting of 1 H-tetrazole, 5-amimotetrazole monohydrate, 5-phenyl-1 H-tetrazole and mixtures of any of the foregoing.

18. The silver deposit solution of claim 1, wherein said additive is present in said solution between about 0.05 and about 4 grams per liter.

19. The silver deposit solution of claim 1, wherein said additive is present in said solution between about 0.3 and about 1.5 grams per liter.

20. The silver deposit solution of claim 1, wherein said solution is essentially free of a complexing agent that is not benzotriazin-4(3H)-one, a pyrrole, triazole, tetrazole, or mixture of any of the foregoing.

21. The silver deposit solution of claim 1, wherein said 1,2,3-benzotriazin-4(3H)-one is present in said solution in a ratio of about 1 g/L per 10 g/L of said additive in said solution.

22. The silver deposit solution of claim 1, wherein said 1,2,3-benzotriazin-4(3H)-one is present in said solution in a ratio of about 1 g/L per 1 g/L of said additive in said solution.

23. The silver deposit solution of claim 1, further comprising at least one component selected from the group consisting of a surfactant, an oxidizer, a wetting agent, a silver stabilizer, a dye, and a complexing agent.

* * * * *